United States Patent
Green et al.

(10) Patent No.: US 7,801,122 B2
(45) Date of Patent: Sep. 21, 2010

(54) METHOD AND APPARATUS FOR EXTENDING SYNCHRONOUS OPTICAL NETWORKS

(75) Inventors: Michael Charles Green, Central Valley, NY (US); Sushil Pandhi, Mahwah, NJ (US)

(73) Assignee: Fujitsu Limited, Kawasaki (JP)

( * ) Notice: Subject to any disclaimer, the term of this patent is extended or adjusted under 35 U.S.C. 154(b) by 1079 days.

(21) Appl. No.: 10/669,725

(22) Filed: Sep. 25, 2003

(65) Prior Publication Data

US 2005/0068960 A1 Mar. 31, 2005

(51) Int. Cl.
*H04L 12/28* (2006.01)
(52) U.S. Cl. .................. 370/389; 370/466; 370/469
(58) Field of Classification Search .......... 370/486, 370/389, 392, 401, 466, 469, 535, 539
See application file for complete search history.

(56) References Cited

U.S. PATENT DOCUMENTS 5,450,407 A * 9/1995 Perlman et al. ............ 370/392
5,950,433 A * 9/1999 Kalina ....................... 60/649
6,731,632 B1 * 5/2004 Takahashi et al. .......... 370/392
6,738,828 B1 * 5/2004 Keats et al. ................ 709/245
2003/0169781 A1 * 9/2003 Duggan ..................... 370/535

\* cited by examiner

*Primary Examiner*—Jayanti K Patel
*Assistant Examiner*—Bo Hui A Zhu
(74) *Attorney, Agent, or Firm*—Hanify & King, PC

(57) ABSTRACT

The number of managed network elements within a SONET network is configured to exceed the number addressable elements in a given address area. This is achieved through the use of SONET extension network elements and a special TL1 command message protocol. Any network element that has only one optical path (protected or unprotected) to an adjacent network in the SONET network can become an extension network element. TL1 command messages may be targeted to an extension network element through its only adjacent network element based on the network element's physical port connecting the network element to the extension network element.

10 Claims, 3 Drawing Sheets

METHOD AND APPARATUS FOR EXTENDING SYNCHRONOUS OPTICAL NETWORKS

FIELD OF THE INVENTION

The present invention relates to synchronous optical networks (SONET) and, more particularly, to a system and method for extending the management of a SONET network to encompass extension network elements within a single addressing area.

BACKGROUND OF THE INVENTION

Optical networks have become a standard technology for the transport of information in the telecommunications industry. A number of different optical network standards have been defined, with each having advantages and disadvantages for different uses. Synchronous optical network (SONET) is one standard for optical telecommunications transport. SONET is expected to provide the transport infrastructure for worldwide telecommunications for at least the next two or three decades. The increased configuration flexibility and bandwidth availability of SONET provides significant advantages over the older telecommunications system, such as reduction in equipment requirements, increase in network reliability, ability to carry signals in a variety of formats, a set of generic standards that enable products from different vendors to be connected, and a flexible architecture capable of accommodating future applications, with a variety of transmission rates. SONET is often used for long-haul, metro level, and access transport applications. In metropolitan areas, the access network often includes high-capacity synchronous optical network (SONET) rings, optical T3 lines, and copper-based T1s.

The management (control, monitoring, and provisioning) of a given SONET network is typically done via operator initiated command messages on a designated controlling host computer system directly connected to one of the network elements (NE's) in the SONET network. Command messages targeted for NE's, other than the directly connected NE, are transported over the optical connections between the NE's using a small portion of the optical bandwidth of the data transport overhead referred to as the Data Control Channel (DCC). Typically, NE's are optically connected to more than one NE in the SONET network requiring an NE to employ routing tables to direct messages on a DCC path leading to the NE for which it is targeted. SONET networks most generally employ OSI routing protocol also over the DCC's between NE's to dynamically populate the routing tables for each NE in the SONET network.

For SONET networks that employ OSI protocol (or any routing protocol scheme, such as OSPF), wherein each NE maintains a routing table entry for every NE in the network) there is generally a limit on the number of directly addressable NE's (for example 255 NE's). This limit is enforced to prevent the DCC's between NE becoming overburdened with OSI protocol messages used to exchange routing information between NE's). Such a limit assures that most of the DCC bandwidth between NE's is used to carry command messages.

Conventionally, one way to reduce the OSI routing burden in a SONET network is to split the network into more than one addressing area. For example, a single SONET network may be split into two separate address areas. Then, to interconnect the networks, one network element in the newly configured network becomes a member of both addressing areas. In this configuration, all control messages from one network area destined for the other network area must pass through the network element sharing membership with both network areas. For this reason, splitting the network into two separate addressing areas often results in a crippling burden on the network element sharing membership in both network areas due to extra control message traffic between the two areas.

Accordingly, there is a need for a technique for addressing additional network elements within a single SONET network. There is a further need for a technique to configure a SONET network to have a large number of network elements in a single addressing area that does not suffer from an excessive OSI routing burden.

SUMMARY OF THE INVENTION

According to the present invention, the number of network elements within a SONET network is configured to exceed the number addressable by the routing tables within the network elements themselves. This is achieved through the selective use of SONET extension network elements that do not participate in the OSI network and a TL1 command message protocol. An network element that has only one optical path (protected or unprotected) to an adjacent network element in the SONET network may become an extension network element (ENE). TL1 command messages may be targeted to an extension network element through its adjacent network element based on the identity of the network element's physical port connecting the network element to the extension network element.

According to an embodiment of the present invention, a method for addressing a network extension element is achieved using the fourth TL1 message field. The method includes receiving a command message that includes an extension network element identifier. The network extension element identifier is replaced with a session identifier and the modified command message is transmitted to a network extension element. The network extension element receives and processes the modified command and transmits a command response, including the session identifier, back to the network element.

The network element may in turn, accept the command response at the network element and determine the port to transmit the command response based on the session ID. The network element may then replace the session ID with an extension network element identifier and forward the modified command response to the source of the original command.

According to another embodiment of the present invention, a method of extending an optical network includes receiving a command message from the optical network including a port identifier specifying the port of a network element that is connected to an extension network element; processing the command message at the extension network element; and sending a response message to the network element.

According to another embodiment of the present invention, a system for extending an optical network includes an extension network element for connection to a network element. The extension network element is configurable to process command messages received from a network element without regard to the terminal identifier within the messages. The extension network element is further configurable to process command messages received from a network element in connection with a local session identification established between the network element and the extension network element. The network element and the extension network element may exchange command and response messages over a DCC connection. In addition, the extension network element does not have a separate terminal identification stored in the routing table of network elements within the network to which the extension network element is connected.

BRIEF DESCRIPTION OF THE FIGURES

The above described features and advantages of various embodiments of the invention will be more fully appreciated with reference to the attached drawings and detailed description.

DETAILED DESCRIPTION

According to the present invention, the number of network elements within a SONET network is configured to exceed the number addressable by the routing tables within the network elements themselves. This is achieved through the use of SONET extension network elements and a special TL1 message protocol. The extension network elements are added to the SONET ring by connecting each extension network element to a network element via a DCC line. TL1 messages may then be addressed from any network element to the extension network element based on the port assigned to interconnect the network element to the extension network element.

Overview of a SONET/LAN System

Figure 1:
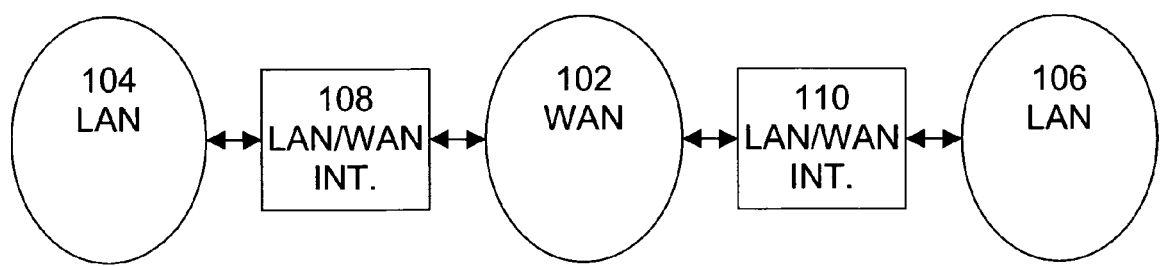
FIG. 1 depicts a typical configuration between a LAN and a WAN system.

An exemplary block diagram of a system 100 in which the present invention may be implemented is shown in FIG. 1. System 100 includes a Wide Area Network 102 (WAN), one or more Local Area Networks 104 and 106 (LAN), and one or more LAN/WAN interfaces 108 and 110. A LAN, such as LANs 104 and 106, is computer network that spans a relatively small area. Most LANs connect workstations and personal computers. Each node (individual computer) in a LAN has its own CPU with which it executes programs, but it also is able to access data and devices anywhere on the LAN. This means that many users can share expensive devices, such as laser printers, as well as data. Users can also use the LAN to communicate with each other, by sending e-mail or engaging in chat sessions.

There are many different types of LANs, Ethernets being the most common for Personal Computers (PCs). Most Apple Macintosh networks are based on Apple's AppleTalk network system, which is built into Macintosh computers.

Most LANs are confined to a single building or group of buildings. However, one LAN can be connected to other LANs over any distance via longer distance transmission technologies, such as those included in WAN 102. A WAN is a computer network that spans a relatively large geographical area. Typically, a WAN includes two or more local-area networks (LANs), as shown in FIG. 1. Computers connected to a wide-area network are often connected through public networks, such as the telephone system. They can also be connected through leased lines or satellites. The largest WAN in existence is the Internet.

Among the technologies that may be used to implement WAN 102 are optical technologies, such as Synchronous Optical Network (SONET) and Synchronous Digital Hierarchy (SDH). SONET is a standard for connecting fiber-optic transmission systems. SONET was proposed by Bellcore in the middle 1980s and is now an ANSI standard. SONET network elements employ the OSI seven-layer model for the transport of management messages between network elements and controlling host computer systems. The standard defines a hierarchy of interface rates that allow data streams at different rates to be multiplexed. SONET establishes Optical Carrier (OC) levels from 51.8 Mbps (about the same as a T-3 line) to 2.48 Gbps. Prior rate standards used by different countries specified rates that were not compatible for multiplexing. With the implementation of SONET, communication carriers throughout the world can interconnect their existing digital carrier and fiber optic systems.

SDH is the international equivalent of SONET and was standardized by the International Telecommunications Union (ITU). SDH is an international standard for synchronous data transmission over fiber optic cables. SDH defines a standard rate of transmission at 155.52 Mbps, which is referred to as STS-3 at the electrical level and STM-1 for SDH. STM-1 is equivalent to SONET's Optical Carrier (OC) levels-3.

LAN/WAN interfaces 108 and 110 provide electrical, optical, logical, and format conversions to signals and data that are transmitted between a LAN, such as LANs 104 and 106, and WAN 102. It may also be used to transport telecommunication voice signals from telecommunication switches.

SONET Network Extension

Figure 2:
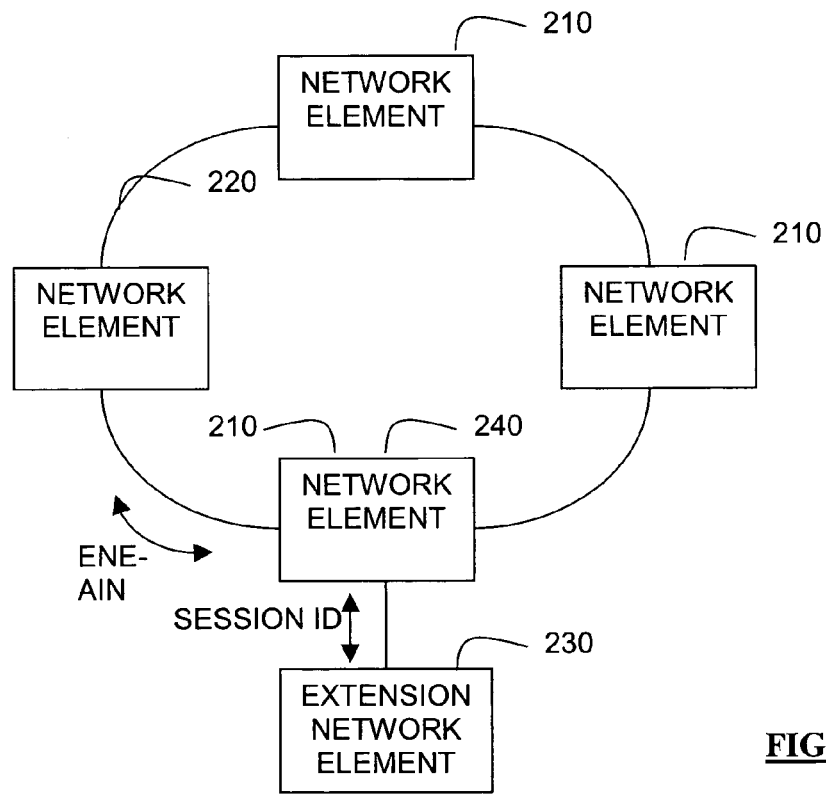
FIG. 2 depicts a SONET ring having a plurality of network elements and an extension network element according to an embodiment of the present invention.

FIG. 2 depicts a SONET network 200, also known as a SONET ring, which includes a plurality of network elements 210 interconnected by optical links 220. The network 200 may be used to implement the WAN 102 shown in FIG. 1. The network 200 further includes an extension network element 230 which is associated with one particular network element 240. The network elements 210 are each part of the network 200 and are addressable by the network 200 as nodes. Each network element 210 in the network 200 includes a stored routing table with the node identification of each other node stored therein. The network elements receive and route conventional frame data based on the routing table in a well-known manner. Unlike the network elements 210, however, the extension network element 230 is not addressable by the network 200 and its terminal identification is not stored in the routing table of the other network elements associated with the network 200.

The extension network element 230 is coupled to the network element 240 via a SONET connection including a data communications channel (DCC). The DCC may be used to exchange commands such as TL1 commands and control information between the network element 210 and the extension network element 230. In order to configure the network 200 so that the extension network element is operative, command messaging such as TL1 (transaction language 1) messaging may be used.

Figure 3:
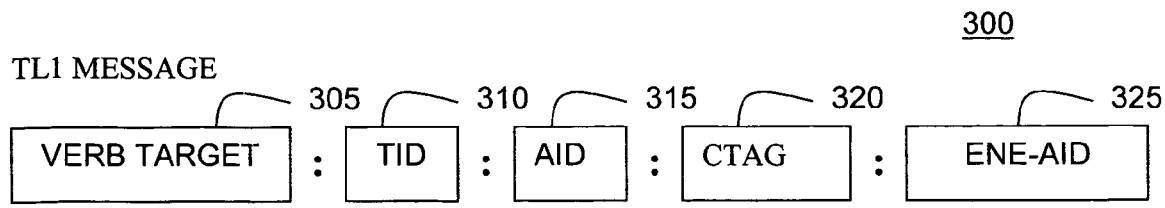
FIG. 3 depicts a format for a command message according to an embodiment of the present invention.

FIG. 3 depicts the format of a TL1 message 300 for addressing an extension network element according to an embodiment of the present invention. Referring to FIG. 3, the TL1 message includes a verb target 305, a TID (terminal identifier) 310, an AID (access identifier) 315, a CTAG (correlation tag) 320, and a general block 325. The TL1 message fields are generally separated by a delimiter such as colon. It will be understood, however, that any convenient delimiter may be used.

TL1 messages may be used to cause a network and network elements within the network to exchange information and perform a variety of tasks. For example, a TL1 message may be used to command a network element to perform a task and return a result, to report an error or alarm condition or to send an acknowledgement of a command. The verbs form the command and may include: connect, disconnect, activate, change, compare, enter and corrupt to name a few. Many additional commands are generally available and supported by network elements. A summary of these commands and their syntax is available from Telecordia technologies, Inc.

The TID field 310 identifies a terminal with alphanumeric information. The AID field 315 identifies a port corresponding to the terminal identified in the TID. The general field 325 is conventionally left blank in TL1 messaging. According to the present invention, however, the general field 325 is used to store values of interest to enable the extension network element 230 to be addressed by TL1 messages without allocating to the extension network element a separate TID. The extension network element 230 is coupled to a network element 240 and is addressable from the network 200 by identifying in a TL1 message the TID of the network element 240, the AID for the incoming message and the port (AID) of the network elements' DCC signal which connects the extension network element 230 to the network element 210.

Figure 4:
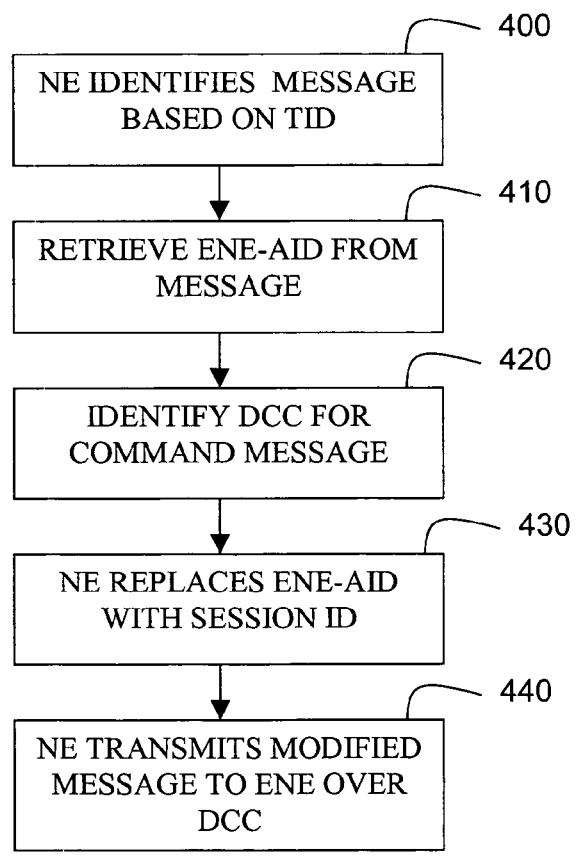
FIG. 4 depicts a method of processing a command message for an extension network element by a network element according to an embodiment of the present invention.

FIG. 4 depicts a method of processing a command message for an extension network element 230 by a network element 240 to which the extension network element is connected according to an embodiment of the present invention. Prior to the method Of FIG. 4, the network element 210 and the extension network element 230 should be configured first to set up a DCC between the network element and the extension network element and second to configure the elements to process command messages according to FIG. 4-6. The processes of FIGS. 4-6 may be handled by software or by altering routing protocols stored in memory with the network element 210 and extension network element 230.

Referring to FIG. 4, in step 400, the network element 240 receives a TL1 message from another network element 210 within the network 200. The network element 240 identifies the message as destined for it based on the terminal identifier within the TID field 310. Then in step 410, the network element 240 retrieves the information stored in the general field 325 of the TL1 message. The information includes the ENE-AID, which specifies the port of the network element corresponding to the DCC through which the network element 240 is connected to the extension network element 230.

In step 420, the network element 240 identifies the DCC associated with the port based on the ENE-AID information. Then in step 430, the network element 240 replaces the general field 325 with a local TL1 session ID value. In step 440, the network element 240 transmits the modified TL1 message to the extension network element 230.

Figure 5:
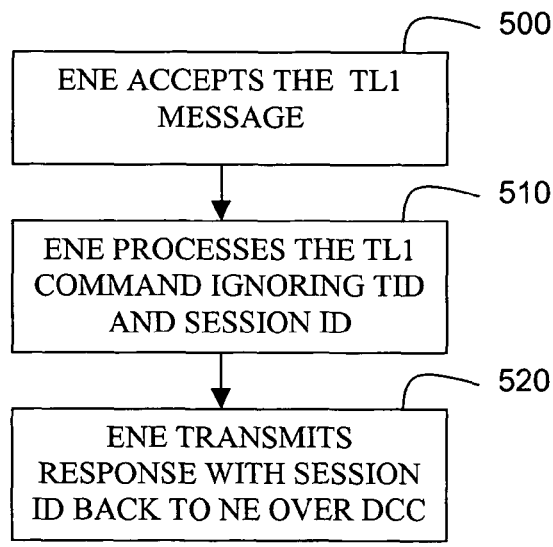
FIG. 5 depicts a method of processing a command message by an extension network element according to an embodiment of the present invention.

FIG. 5 depicts a method of processing a command message by an extension network element according to an embodiment of the present invention. The method of FIG. 5 begins at the conclusion of the method of FIG. 4. Referring to FIG. 5, in step 500, the extension network element 230 receives and accepts the TL1 message from the network element 240. In step 510, the extension network element processes the TL1 command, ignoring the TID field 310 the session ID stored in the general field 325 by the network element. Then, in step 520, for a command and response message, the extension network element transmits a response back to the network element 240 over the same DCC from which the message was received. The response includes the session ID in the general field 325.

Figure 6:
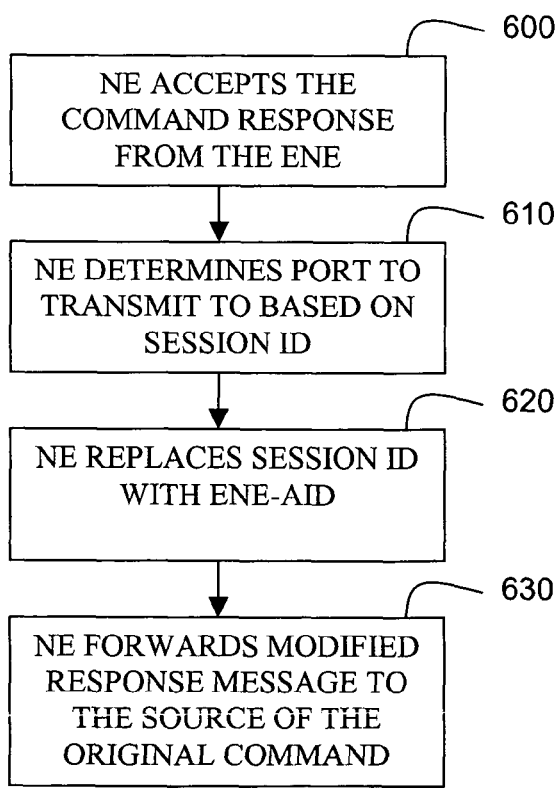
FIG. 6 depicts a method of processing a response to a command message from an extension network element by a network element according to an embodiment of the present invention.

FIG. 6 depicts a method of processing a response to a command message from an extension network element by a network element according to an embodiment of the present invention. The method of FIG. 6 begins where the method of FIG. 5 ends. Referring to FIG. 6, in step 600 the network element 240 accepts the command response from the extension network element 230. Then in step 610, the network element 240 determines the port within the network 200 to transmit the command response to based on the session ID from the command response. The network element performs this determination by retrieving from storage the session ID and correlating the session ID to the port from which the original message was received.

In step 620, the network element replaces the session ID in the general field 325 with the ENE AID corresponding to the port to which the extension network element is coupled. Then in step 630, the network element 240 forwards the modified response message to the source of the original command.

In this manner, the methods of FIGS. 4-6 permit TL1 messages to be exchanged with extension network elements, even though the extension network elements are not separately addressable by the network 200. The general field 325 within a TL1 message is exploited to embed information that is used to access the extension network elements. Therefore, the extension network elements are addressable through the network element without increasing the size of the routing table of any elements within the network 200. Numerous network extension elements may be added in this manner to a network and more than one network extension element may be added to each network element.

While particular embodiments of the present invention have been shown and described, it will be understood by those having ordinary skill in the art that changes may be made to those embodiments without departing from the spirit and scope of the invention.

What is claimed is:

1. A method for addressing a network extension element for a synchronous optical network, comprising:
    addressing an extension network element using a modified transaction language 1 message including a session identifier in a field of the modified transaction language 1 message that originally contained an extension network element identifier in an original transaction language 1 message to set up a SONET connection;
    transmitting a response to the modified transaction language 1 message including the session identifier back to a network element;
    determining a port to transmit the response based on the session identifier included in the response;
    replacing the session identifier in the response with the extension network element identifier; and
    forwarding a modified response including the extension network element identifier to a source network element that transmitted the original transaction language 1 message using the port.

2. The method according to claim 1, further comprising:
    receiving the modified transaction language 1 message including the extension network element identifier in the field of the modified transaction language 1 message at a network element specified in a terminal identifier field of the transaction language 1 message, wherein the field is a general field in the original transaction language 1 message;

replacing the extension network element identifier with the session identifier; and transmitting the modified transaction language 1 message to the extension network element.

3. The method according to claim 2, further comprising:

receiving the modified transaction language 1 message at the extension network element; and processing the modified transaction language 1 message at the extension network element.

4. The method according to claim 3, further comprising:

accepting the command response at the network element.

5. A method of extending an optical network, comprising:

receiving a command message from the optical network including a port identifier specifying a port of a network element that is connected to an extension network element;

replacing the port identifier with a session identifier in the command message prior to the transmitting the command message to the extension network element sending a response message to the network element;

determining a port to transmit the response based on the session identifier included in the response;

replacing the session identifier of the response with a extension network element identifier of the response; and forwarding a modified response to a second network element.

6. The method according to claim 5, further comprising:

identifying a data communication channel corresponding to the port identifier; and transmitting the command message to the extension network element over the identified data communication channel.

7. The method according to claim 5, further comprising:

transmitting the response message over the network.

8. A system for extending an optical network, comprising:

an extension network element for connection to a network element of an optical network, wherein the extension network element is configurable to:

receive a modified command message from the network element of the optical network that includes a session identifier in a field of the modified command message that originally contained an extended network element identifier; and transmit a response to the modified command message including the session identifier back to the network element of the optical network; and wherein the network element of the optical network is configured to:

determine a port to transmit the response based on the session identifier included in the response;

replace the session identifier with a extension network element identifier of the response; and forward a modified responses to respective source network elements of the optical network that transmitted the original command message.

9. The system according to claim 8, wherein the extension network element exchanges command messages and responses with the network element of the optical network via a data communication channel connection.

10. The system according to claim 8, wherein the extension network element does not have a separate terminal identification stored in the routing table of network elements of the optical network within the network to which the extension network element is connected.

* * * * *